United States Patent
Wang et al.

(10) Patent No.: US 12,264,256 B2
(45) Date of Patent: Apr. 1, 2025

(54) SLIP-RESISTANT COATING, METHOD OF COATING A SUBSTRATE AND A COATED SUBSTRATE

(71) Applicant: SIKA TECHNOLOGY AG, Baar (CH)

(72) Inventors: Chia Wang, Shakopee, MN (US); Brian Mullen, Shakopee, MN (US)

(73) Assignee: SIKA TECHNOLOGY AG, Baar (CH)

( * ) Notice: Subject to any disclaimer, the term of this patent is extended or adjusted under 35 U.S.C. 154(b) by 889 days.

(21) Appl. No.: 17/272,322

(22) PCT Filed: Sep. 27, 2019

(86) PCT No.: PCT/US2019/053685
§ 371 (c)(1),
(2) Date: Feb. 28, 2021

(87) PCT Pub. No.: WO2020/069462
PCT Pub. Date: Apr. 2, 2020

(65) Prior Publication Data
US 2021/0189171 A1     Jun. 24, 2021

Related U.S. Application Data

(60) Provisional application No. 62/739,136, filed on Sep. 28, 2018.

(51) Int. Cl.
| | | |
|---|---|---|
| C09D 175/04 | (2006.01) | |
| C08G 18/30 | (2006.01) | |
| C08L 69/00 | (2006.01) | |
| C09D 5/00 | (2006.01) | |
| C09D 7/65 | (2018.01) | |
| C09K 3/14 | (2006.01) | |

(52) U.S. Cl.
CPC ......... *C09D 175/04* (2013.01); *C08G 18/307* (2013.01); *C09D 5/00* (2013.01); *C09D 5/002* (2013.01); *C09D 7/65* (2018.01); *C09K 3/149* (2013.01); *C08L 69/00* (2013.01)

(58) Field of Classification Search
CPC ........ C09D 175/04; C09D 5/002; C09D 7/65; C09D 5/00; C08G 18/307; C08L 69/00; C09K 3/149
See application file for complete search history.

(56) References Cited

U.S. PATENT DOCUMENTS

| | | |
|---|---|---|
| 3,527,146 A | 9/1970 | Garling |
| 7,037,958 B1 * | 5/2006 | Hansen .................... B05D 7/54 |
| | | 523/428 |
| 2008/0167401 A1 | 7/2008 | Robinson et al. |

FOREIGN PATENT DOCUMENTS

| | | |
|---|---|---|
| EP | 3088632 A1 | 11/2016 |
| WO | 9800241 A1 | 1/1998 |

OTHER PUBLICATIONS

Author Unknown, Redwood Plastics Polycarbonate Material Safety Data Sheet, May 1, 2015, pp. 1-3.*
Author Unknown, Hexion Technical Data Bulletin for EPON Resin 828, Sep. 2005, pp. 1-8.*
Author Unknown, Dow Material Safety Data Sheet for D.E.R. 331 Epoxy Resin, Sep. 2, 2006, pp. 1-8.*
Author Unknown, Krayden Inc. product bulletin "Advanced Materials Araldite GY 6010 a Medium Viscosity, Unmodified Liquid Epoxy Resin", Jul. 3, 2007, pp. 1-8.*
International Search Report for Application No. PCT/US2019/053685 dated Jan. 8, 2020.
Written Opinion for Application No. PCT/US2019/053685 dated Jan. 8, 2020.

* cited by examiner

*Primary Examiner* — Patrick D Niland
(74) *Attorney, Agent, or Firm* — Oliff PLC

(57) ABSTRACT

A polymeric coating composition for application to a substrate includes a polymer matrix and an organic polymeric aggregate. The polymeric aggregate is utilized as a partial or complete replacement for aggregate containing free respirable crystalline silica traditionally included in anti-slip or anti-skid coating compositions. Methods of making the coating and coating a substrate with the coating composition to provide a slip- or skid-resistant coating on a surface of a substrate are also disclosed.

19 Claims, 5 Drawing Sheets

SLIP-RESISTANT COATING, METHOD OF COATING A SUBSTRATE AND A COATED SUBSTRATE

CROSS REFERENCE TO RELATED APPLICATIONS

This application is a national stage application of International Application No PCT/US2019/053685, filed 27 Sep. 2019, which claims priority from U.S. Provisional Patent Application No. 62/739,136, filed 28 Sep. 2018, both of which applications are incorporated herein by reference.

TECHNICAL FIELD

The present disclosure is directed to a coating for a substrate, a method of making a coating for a substrate, a method of coating a substrate with the coating, and a substrate coated with the coating. The present disclosure is more particularly directed to a slip-resistant coating for a substrate, a method of making a slip-resistant coating for a substrate, a method of coating a substrate with the slip-resistant coating, and a substrate coated with the slip-resistant coating.

BACKGROUND

Crystalline silica is a natural mineral that is found construction materials such as sand, stone, brick, concrete, and mortar. Significant known health risks are associated with exposure to crystalline silica, including silicosis, lung cancer, chronic obstructive pulmonary disease ("COPD") and kidney disease.

According to the National Institute for Occupational Safety and Health (NIOSH), millions of U.S. workers are exposed to respirable crystalline silica in a variety of industries and occupations, including construction, sandblasting and mining. Because of the health risks in the construction industry associated with exposure to crystalline silica, the Occupational Safety and Health Administration ("OSHA") has developed and issued an industry standard to limit worker exposure to respirable crystalline silica dust in construction work. This standard can be found at 29 C.F.R. § 1926.1153 (2016). The OSHA standard requires employers to take significant steps to protect workers from exposure to respirable crystalline silica.

Silica sand, which includes respirable free crystalline silica, is commonly used as an anti-slip or anti-skid additive in floor coating compositions. A floor coating is applied to the surface of a horizontal floor substrate by methods widely known in the industry to provide a seamless layer of a protective coating. Prior to curing the floor coating composition, the silica sand additive is then typically spread by broadcasting across the coated surface of the floor substrate by contractor. The particles of silica sand become trapped within the floor coating near the surface of the coating to provide an anti-slip or anti-skid texture on the surface of the floor coating. Alternatively, the silica sand containing respirable crystalline silica is pre-mixed with the polymer matrix, and the mixture subsequently rolled onto the surface of the target substrate.

The act of mixing the silica sand with the polymer matrix, or spreading the silica sand aggregate onto the liquid floor coating, exposes workers to possible inhalation of respirable crystalline silica from the silica sand. Thus, there is a need in the art to develop anti-slip coating compositions and methods of using anti-slip coating compositions to coat target substrates that minimizes or eliminates workers' exposure to respirable crystalline silica. There is also a need in the art to develop coating materials that exhibit improved impact, abrasion and slip resistance, as compared to coating materials containing aggregate composed primarily of crystalline silica.

SUMMARY

According to a first aspect, disclosed is a coating comprising an organic polymer matrix and a polymer aggregate.

According to a second aspect, disclosed is a coated substrate comprising a substrate having opposite facing first and second major surfaces, and at least one layer of a coating comprising a polymer matrix and an organic polymer aggregate on at least a portion of one of said first or second major surfaces of said substrate.

According to a third aspect, disclosed is a method for coating a surface of a substrate with a coating, said method comprising coating at least one layer of a coating composition comprising a polymer matrix and an organic polymer aggregate on at least a portion of a surface of said substrate.

According to a fourth aspect, disclosed is a method for coating a substrate with a coating composition, said method comprising coating at least one layer of a polymer coating on at least a portion of a surface of said substrate and spreading a plurality of organic polymer aggregate onto said polymer coating.

According to a fifth aspect, disclosed is a floor comprising a floor substrate having opposite facing first and second major surfaces and at least one layer of a coating comprising a polymer matrix and an organic polymer aggregate on at least a portion of one of said first or second major surfaces of said floor substrate.

According to a sixth aspect, disclosed is a deck comprising a deck substrate having opposite facing first and second major surfaces and at least one layer of a coating comprising a polymer matrix and an organic polymer aggregate on at least a portion of one of said first or second major surfaces of said deck substrate.

According to a seventh aspect, disclosed is a method for making a coating composition comprising mixing together a polymer matrix and a plurality of organic polymer aggregate.

DETAILED DESCRIPTION

Figure 1:
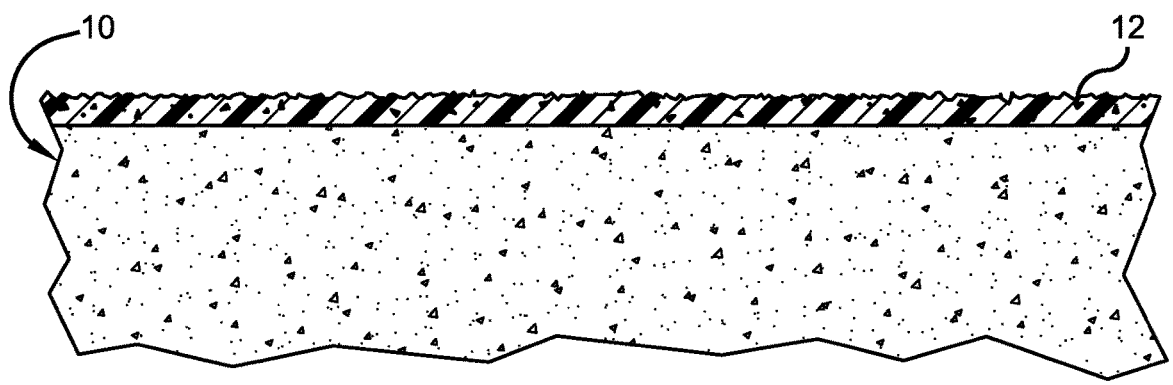
FIG. 1 is a cross-sectional view of a substrate coated with an illustrative slip-resistant coating composition comprising a polymer matrix and an organic polymeric aggregate.

The present disclosure is directed to a coating composition for a substrate that minimizes or eliminates the amount of free crystalline silica present in the coating composition. While the coating composition minimizes, substantially eliminates, or completely eliminates the presence of free crystalline silica, the coating composition also possesses improved processability and anti-slip performance.

The present disclosure provides coating compositions having non-skid properties. As used herein the terms "non-skid," "non-slip," "anti-skid," "anti-slip," "slip-resistant," and "skid-resistant" coatings are used interchangeably and refer to a coating that dries to a textured surface that resists sliding of pedestrians and vehicles on building floors, balcony decks, parking decks, parking ramps, plaza decks, stadium decks, stairs, and the like.

The coating composition comprises a polymer matrix and an organic polymer aggregate. The coating composition is completely or substantially free of crystalline silica. Without limitation, and only by way of illustration, the polymer matrix of the coating composition may be selected from epoxy, polyaspartic, polymethacrylate, polysulfides, polyurethane, and polyureas.

According to illustrative embodiments, the polymer matrix of the coating composition comprises a polyurethane as the polymer matrix. A polyurethane is a reaction product of at least isocyanate, at least one polyol, and optional other reactants. Any known isocyanate may be utilized to form the polyurethane polymer. The isocyanate may include at least one of aromatic isocyanates, aliphatic isocyanates, cycloaliphatic isocyanates, araliphatic isocyanates or mixtures thereof. The isocyanate component may be a diisocyanate or a triisocyanate or mixtures thereof. Examples of aromatic isocyanates which may be utilized include but are not limited to methylene diphenyl diisocyanates (MDI), toluene diisocyanates (TDI), polymeric methylene diphenyl diisocyanates (PMDI), p-phynyl diisocyanates (PDI), naphthalene diisocyanates (NDI), aliphatic isocyanates such as hexamethylene diisocyanates (HDI), hexamethylene diisocyanate trimers (HDI Trimers), dicyclohexylmethane diisocyanates (HINDI), isophorone diisocyanates (IPDI), cyclohexane diisocyanate (CHDI), tetramethylxylylene diisocyanate (TMXDI) or mixtures thereof.

Any known polyol may be utilized to form the polyurethane polymer. Useful polyols include compounds having at least one isocyanate-reactive functionality. Suitable polyols include, without limitation, polyether polyols, polyester polyols, polyalkylene glycols, polybutadiene polyols, alkylene diols and combinations thereof. Suitable polyester polyols include for example those based on caprolactone, which are also referred to as "polycaprolactones".

Suitable polyurethane polymers are commercially available from BASF Corporation (Florham Park, N.J., USA) under the designations MASTERSEAL 225, 275 and 295. MASTERSEAL 225 is a liquid applied one-component moisture-curing polyurethane coating. MASTERSEAL 275 and 295 are both liquid applied two-component coatings comprising polyurethanes. Without limitation, a suitable epoxy coating is commercially available from BASF Corporation under the designation MASTERSEAL C350.

According to certain embodiments, the organic polymeric aggregate may be prepared a thermoset polymer resin. By way of example, the organic polymeric aggregate used in the coating composition may be selected from polycarbonate, melamine formaldehyde, urea formaldehyde and the like. According to certain illustrative embodiments, the organic polymeric aggregate comprises a polycarbonate aggregate. According to certain embodiments, the organic polymeric aggregate is substantially free of any inorganic component. According to other embodiments, the organic polymeric aggregate is free of any inorganic component. The organic polymeric aggregate may also be treated an anti-static agent to prevent agglomeration of aggregate particles. The organic polymeric aggregate possesses a suitable hardness to impart abrasion and impact resistance, along with the desired slip-resistance, to the polymeric matrix. According to certain embodiments, the organic polymeric aggregate possesses a Moh's Hardness of at least 3.0, or at least 3.5, at least 4.0, or at least 4.5 or at least 5.0.

Without limitation, and only by way of illustration, suitable polycarbonate aggregate for use in the coating is commercially available from Composition Materials Co., Inc. (Milford, Conn., USA) under the trademark CLEAR-CUT®. The CLEAR-CUT® polymeric aggregate is a thermoset polyallyldiglycol carbonate. Other non-limiting useful polymeric aggregates include PLASTI-GRIT® TYPE III thermoset melamine formaldehyde and PLASTI-GRIT® TYPE II thermoset urea formaldehyde, both commercially available from Composition Materials Co., Inc. Further suitable organic polymeric aggregate include polyester and acrylic plastic aggregates commercially available from Composition Materials Co., polypropylene aggregate commercially available H&C Products Group, Cleveland, Ohio, USA under the designation Shark Grip, and ground up polyethylene aggregate.

According to certain embodiments, the coating composition may also include an aggregate other that the organic polymeric aggregate. For example, and without limitation, the coating composition may comprise a polymeric matrix, organic polymeric aggregate, and a non-polymeric aggregate. According to certain embodiments, the coating composition may comprise a polymeric matrix, organic polymeric aggregate, and silica sand aggregate as the non-polymeric aggregate. According to other embodiments, the coating composition may comprises a polymer matrix, polycarbonate, silica sand, and one or more other thermoplastic or thermoset aggregates. According to other embodiments, the coating composition may comprise other aggregate types, including, for example, polyesters, aromatic polycarbonates, polyarylates, polyarylethers, polyetherimides, polyimides, polyamides, glass beads, acrylic plastic, metal oxides (for example, aluminum oxide), and polyalkylenes (for example, polypropylene, polyethylene, etc).

The organic polymeric aggregate may comprise a non-round or non-spherical aggregate particle. According to certain illustrative embodiments, the ratio of the longest dimension to the shortest dimension of the organic polymeric aggregate of the coating composition is greater than the ratio of longest dimension to the shortest dimension of crystalline silica sand. According to certain embodiments, the ratio of the longest dimension to the shortest dimension of the polymeric aggregate of the coating composition is greater than 1.25:1. According to certain embodiments, the ratio of the longest dimension to the shortest dimension of the organic polymeric aggregate of the coating composition is greater than 1.3:1. According to certain embodiments, the ratio of the longest dimension to the shortest dimension of the organic polymeric aggregate of the coating composition is greater than 1.4:1. According to certain embodiments, the ratio of the longest dimension to the shortest dimension of the organic polymeric aggregate of the coating composition is greater than 1.5:1. According to certain embodiments, the ratio of the longest dimension to the shortest dimension of the organic polymeric aggregate of the coating composition is greater than 1.6:1. According to certain embodiments, the ratio of the longest dimension to the shortest dimension of the organic polymeric aggregate of the coating composition is greater than 1.7:1. According to certain embodiments, the ratio of the longest dimension to the shortest dimension of the organic polymeric aggregate of the coating composition is greater than 1.8:1. According to certain embodiments, the ratio of the longest dimension to the shortest dimension of the organic polymeric aggregate of the coating composition is greater than 1.9:1. According to certain embodiments, the ratio of the longest dimension to the shortest dimension of the organic polymeric aggregate of the coating composition is greater than 2:1.

The ratio of polymer matrix to organic polymeric aggregate in the coating composition may be in the range of about 1:1 to about 20:1. According to certain illustrative embodiments, the ratio of polymer matrix to organic polymeric aggregate in the coating composition in the range of 2:1 to 10:1. According to certain illustrative embodiments, the ratio of polymer matrix to organic polymeric aggregate in the coating composition in the range of 3:1 to 10:1. According to certain illustrative embodiments, the ratio of polymer matrix to organic polymeric aggregate in the coating composition in the range of 4:1 to 10:1. According to certain illustrative embodiments, the ratio of polymer matrix to organic polymeric aggregate in the coating composition in the range of 5:1 to 10:1. According to certain illustrative embodiments, the ratio of polymer matrix to organic polymeric aggregate in the coating composition in the range of 6:1 to 10:1. According to certain illustrative embodiments, the ratio of polymer matrix to organic polymeric aggregate in the coating composition in the range of 7:1 to 10:1. According to certain illustrative embodiments, the ratio of polymer matrix to organic polymeric aggregate in the coating composition in the range of 8:1 to 10:1. According to certain illustrative embodiments, the ratio of polymer matrix to organic polymeric aggregate in the coating composition in the range of 9:1 to 10:1.

According to certain illustrative embodiments, the ratio of polymer matrix to organic polymeric aggregate in the coating composition is about 2:1. According to certain illustrative embodiments, the ratio of polymer matrix to organic polymeric aggregate in the coating composition is about 4:1. According to certain illustrative embodiments, the ratio of polymer matrix to organic polymeric aggregate in the coating composition is about 6:1. According to certain illustrative embodiments, the ratio of polymer matrix to organic polymeric aggregate in the coating composition is about 8:1.

To control the settling of the polymer aggregate and to provide a more homogenous mixture of polymer matrix and organic polymeric aggregate for a longer period of time, the density of the organic polymer aggregate should approximate the density of the polymer matrix. According to certain illustrative embodiments, for example, the density of the polymer matrix and organic polymer aggregate should be within ±40 percent of each other. According to certain illustrative embodiments, for example, the density of the polymer matrix and organic polymer aggregate should be within ±25 percent of each other. According to other illustrative embodiments, for example, the density of the polymer matrix and organic polymer aggregate should be within ±20 percent of each other. According to other illustrative embodiments, for example, the density of the polymer matrix and organic polymer aggregate should be within ±15 percent of each other. According to other illustrative embodiments, for example, the density of the polymer matrix and organic polymer aggregate should be within ±10 percent of each other. According to other illustrative embodiments, for example, the density of the polymer matrix and organic polymer aggregate should be within ±5 percent of each other. According to other illustrative embodiments, for example, the density of the polymer matrix and organic polymer aggregate should be within ±4 percent of each other. According to other illustrative embodiments, for example, the density of the polymer matrix and organic polymer aggregate should be within ±3 percent of each other. According to other illustrative embodiments, for example, the density of the polymer matrix and organic polymer aggregate should be within ±2 percent of each other. According to other illustrative embodiments, for example, the density of the polymer matrix and organic polymer aggregate should be within ±1 percent of each other. According to other illustrative embodiments, for example, the density of the polymer matrix and organic polymer aggregate should be within ±0.9, ±0.8, ±0.7, ±0.6, ±0.5, ±0.4, ±0.3, ±0.2, or ±0.1 percent of each other.

The disclosed coating composition may also additives such as abrasion resistance improvers, absorbents, rheological modifiers, plasticizers, antifoaming agents, antifouling agents, thixotropic agents, pigments, fillers, additional aggregate, extenders, reinforcing agents, flow control agents, catalysts, wetting agents, adhesion promoters, thickening agents, flame-retarding agents, antioxidants, elastomers, anti-settling agents, diluents, UV light stabilizers, air release agents, solvents, dispersing aids, and mixtures thereof.

It should be understood that when a range of values is described in the present disclosure, it is intended that any and every value within the range, including the end points, is to be considered as having been disclosed. For example, a ratio in "a range of from about 1:1 to about 20:1" is to be read as indicating each and every possible ratio between 1:1 and 20:1. It is to be understood that the inventors appreciate and understand that any and all ratios within the range of ratios are to be considered to have been specified, and that the inventors have possession of the entire range and all the values within the range.

In the present disclosure, the term "about" used in connection with a value is inclusive of the stated value and has the meaning dictated by the context. For example, the term "about" includes at least the degree of error associated with the measurement of the particular value. One of ordinary skill in the art would understand the term "about" is used herein to mean that an amount of "about" of a recited value results the desired degree of effectiveness in the compositions and/or methods of the present disclosure. One of ordinary skill in the art would further understand that the metes and bounds of the term "about" with respect to the value of a percentage, amount or quantity of any component in an embodiment can be determined by varying the value, determining the effectiveness of the compositions for each value, and determining the range of values that produce compositions with the desired degree of effectiveness in accordance with the present disclosure. The term "about" is further used to reflect the possibility that a composition may contain trace components of other materials that do not alter the effectiveness of the composition.

In the present disclosure, the term "substantially" refers to a degree of deviation that is sufficiently small so as to not measurably detract from the identified property or circumstance. The exact degree of deviation allowable may in some cases depend on the specific context. The aggregate used in the coating composition is substantially free of crystalline silica. As used herein, substantially free of crystalline silica means that the total aggregate content of the coating composition includes from 0 to about 20 weight percent crystalline silica. The total aggregate content includes crystalline silica particles and/or aggregate having least one region of crystalline silica. According to certain embodiments, substantially free of crystalline silica means that the total aggregate content of the coating composition includes from 0 to about 15 weight percent crystalline silica. According to certain embodiments, substantially free of crystalline silica means that the total aggregate content of the coating composition includes from 0 to about 10 weight percent crystalline silica. According to certain embodiments, substantially free of crystalline silica means that the total aggregate content of the coating composition includes from 0 to about 9 weight percent crystalline silica. According to certain embodiments, substantially free of crystalline silica means that the total aggregate content of the coating composition includes from 0 to about 8 weight percent crystalline silica. According to certain embodiments, substantially free of crystalline silica means that the total aggregate content of the coating composition includes from 0 to about 7 weight percent crystalline silica. According to certain embodiments, substantially free of crystalline silica means that the total aggregate content of the coating composition includes from 0 to about 6 weight percent crystalline silica. According to certain embodiments, substantially free of crystalline silica means that the total aggregate content of the coating composition includes from 0 to about 5 weight percent crystalline silica. According to certain embodiments, substantially free of crystalline silica means that the total aggregate content of the coating composition includes from 0 to about 4 weight percent crystalline silica. According to certain embodiments, substantially free of crystalline silica means that the total aggregate content of the coating composition includes from 0 to about 3 weight percent crystalline silica. According to certain embodiments, substantially free of crystalline silica means that the total aggregate content of the coating composition includes from 0 to about 2 weight percent crystalline silica. According to certain embodiments, substantially free of crystalline silica means that the total aggregate content of the coating composition includes from 0 to about 1 weight percent crystalline silica. According to certain embodiments, substantially free of crystalline silica means that the total aggregate content of the coating composition includes from 0 to about 0.5 weight percent crystalline silica. According to certain illustrative embodiments, the coating composition is free of crystalline silica. If crystalline silica is present in a coating composition that is "substantially free" of crystalline silica, then any such amount of crystalline silica may be unintentionally present from the raw materials from which coating composition is made, or may be intentionally added, or both.

The coating composition may be applied to any substrate that is in need of a durable and slip- or skid-resistant coating. The coating composition may be applied to any horizontal or substantially horizontal surface that experiences pedestrian or vehicular traffic. For example, and without limitation, the coating composition may be applied to building floors, balcony decks, parking decks, parking ramps, plaza decks, stadium decks, stairs, roofs, and the like.

A primer may be utilized to promote adhesion and bonding of the coating composition to the surface of the underlying substrate. The primer may penetrate the pore structure of the underlying structure to provide a high bond layer for the polymeric coating composition. Individuals of ordinary skill in the art can easily determine suitable primers without undue experimentation. Without limitation, useful primers for application to the underlying substrate include MasterSeal P173, P255, and P176, Sikaflex 429 Primer, Tremco Vulkem 171 Primer, and Neogard 7797/7798, 70714/70715, and 7740/7741. The primer may be applied to the surface of the substrate to be protected by any conventional method for application of a primer to a surface of a substrate. Without limitation, application of the primer may be performed using a roller, brush, spraying, squeegee and the like. Individuals of ordinary skill in the art can easily determine suitable methods for application of the primer without undue experimentation.

A basecoat may be applied to a surface of an underlying substrate. Without limitation, suitable basecoats include those commercially available from BASF Corporation under the designations MASTERSEAL M200, M205, M265, and M350. The basecoat may be applied by a roller, brush, sprayer, squeegee and the like.

A filler, patch or other repair material may also be utilized to fill small cracks, defects, flaws, or voids in the underlying substrate to which the coating composition is to be applied to provide a smooth and even surface for application of the coating composition. Such preparation provides a smooth surface to promote intimate contact and even support of subsequent layers and minimize surface irregularities which would otherwise become stress concentration sites. Without limitation, an example of a useful filler or repair material that can be utilized is MASTEREMACO 1060 and 1061, or other cementitious materials. Individuals of ordinary skill in the art can easily determine suitable fillers without undue experimentation.

One or more layers of the coating composition may be applied to the surface of a substrate to provide a slip- or skid-resistant coating on the surface of the substrate. The coating composition may be applied to the surface of a substrate with a brush, mop, roller, sprayer, or squeegee. The liquid coating composition may be applied to a wide variety of substrates, such as concrete, masonry, cement board, gypsum board, plywood, particle board, oriented strand board and the like.

Figure 2:
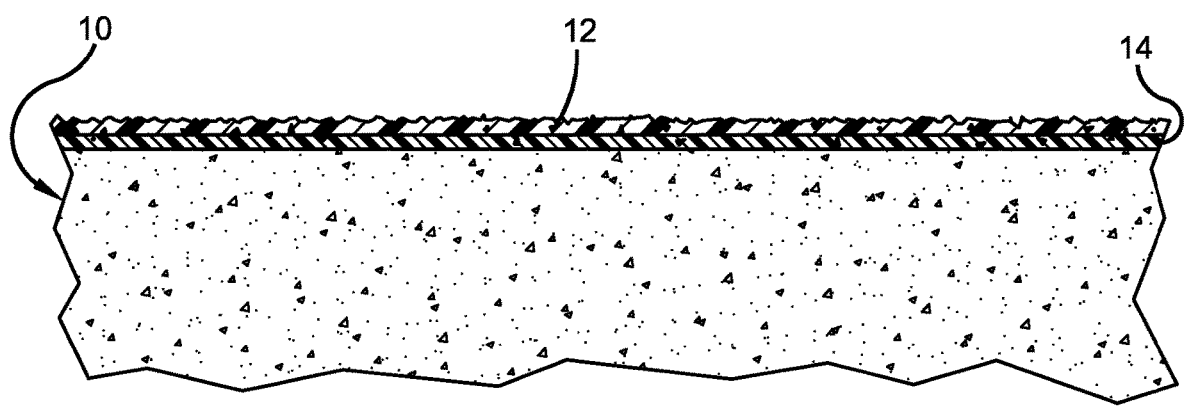
FIG. 2 is a cross-sectional view of a substrate coated with a base coat and top coat of an illustrative slip-resistant coating composition comprising a polymer matrix and an organic polymeric aggregate.
Figure 3:
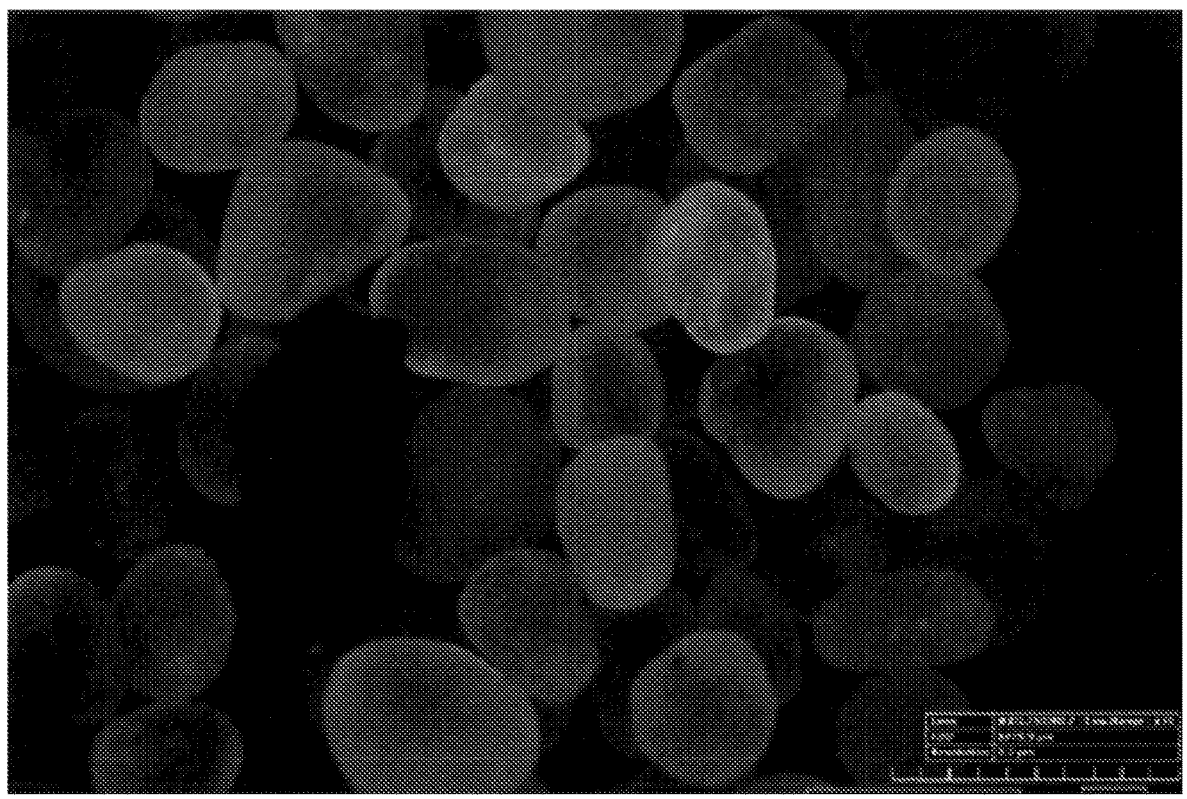
FIG. 3 is a scanning electron microscope (SEM) image of smooth round crystalline silica particles.
Figure 4:
FIG. 4 is an SEM image of angular polyallyldiglycol carbonate aggregate particles.

The slip-resistant coating composition is readily understood when read in conjunction with illustrative FIGS. 1-2. It should be noted that the slip-resistant coating composition is not limited to any of the illustrative embodiments shown in the drawing figures, but rather should be construed in breadth and scope in accordance with the disclosure provided herein.

FIG. 1 is a cross-sectional view of a substrate (10) coated with an illustrative slip-resistant coating composition (12) comprising a polymer matrix and a polymeric aggregate that is substantially free of aggregates containing crystalline silica. According to certain embodiments, the substrate (10) is first cleaned with conventionally-known commercial cleansers so as to remove any foreign substances such as oils, loose granular particles and the like. The cleaned substrate (10) may optionally be mechanically abraded to impart a roughened porous surface. The substrate (10) may then be cleaned again to remove dust and debris that was generated from the abrasion process. Once the substrate (10) has been properly cleaned and roughened, it is ready for application of the slip-resistant coating composition (12).

FIG. 2 is a cross-sectional view of a substrate (10) coated with a base coat (14) such as a primer, which is then top coated with an illustrative slip-resistant coating composition

(12) comprising a polymer matrix and a polymeric aggregate that is substantially free of aggregates containing crystalline silica.

EXAMPLES

The following examples are set forth merely to further illustrate the coating compositions and methods of making the coating. The illustrative examples should not be construed as limiting the coating composition, the coated substrate incorporating the coating composition, or the methods of making or using the coating composition in any manner.

Visual Analysis

Example 1

A liquid applied coating composition comprising a one-component moisture-curing polyurethane (MASTERSEAL 225) and polycarbonate aggregate (CLEAR-CUT) was used to coat a 10 ft×10 ft area of a test substrate. The mix ratio of the polyurethane to the polycarbonate aggregate was 2:1 by volume. The mineral aggregate was then added to the polyurethane coating and mixed for 2-3 minutes. The mixture was then rolled onto the substrate area with roller, squeegee or both.

Example 2

A liquid applied coating composition comprising a two-component moisture-curing polyurethane (MASTERSEAL 275) and polycarbonate aggregate (CLEAR-CUT) was used to coat a 10 ft×10 ft area of a test substrate. The mix ratio of the polyurethane to the polycarbonate aggregate was 2:1 by volume. Part A and Part B was mixed for 2-3 minutes. The mineral aggregate was then added to the polyurethane coating and mixed for 2-3 minutes. The mixture was then rolled onto the substrate area with roller, squeegee or both.

Example 3

A liquid applied coating composition comprising a two-component moisture-curing polyurethane (MASTERSEAL 295) and polycarbonate aggregate (CLEAR-CUT). The mix ratio of the polyurethane to the polycarbonate aggregate was 2:1 by volume. Part A and Part B was mixed for 2-3 minutes. The mineral aggregate was then added to the polyurethane coating and mixed for 2-3 minutes. The mixture was then rolled onto the substrate area with roller, squeegee or both.

Example 4

A liquid applied coating composition comprising a one-component moisture-curing polyurethane (MASTERSEAL 225) and polycarbonate aggregate (CLEAR-CUT) was used to coat a test substrate. The mix ratio of the polyurethane to the polycarbonate aggregate was 4:1 by volume. The mineral aggregate was then added to the polyurethane coating and mixed for 2-3 minutes. The mixture was then rolled onto the substrate area with roller, squeegee or both.

Example 5

A liquid applied coating composition comprising a one-component moisture-curing polyurethane (MASTERSEAL 225) and polycarbonate aggregate (CLEAR-CUT) was used to coat a test substrate. The mix ratio of the polyurethane to the polycarbonate aggregate was 6:1 by volume. The mineral aggregate was then added to the polyurethane coating and mixed for 2-3 minutes. The mixture was then rolled onto the substrate area with roller, squeegee or both.

Example 6

A liquid applied coating composition comprising a one-component moisture-curing polyurethane (MASTERSEAL 225) and polycarbonate aggregate (CLEAR-CUT) was used to coat a test substrate. The mix ratio of the polyurethane to the polycarbonate aggregate was 8:1 by volume. The mineral aggregate was then added to the polyurethane coating and mixed for 2-3 minutes. The mixture was then rolled onto the substrate area with roller, squeegee or both.

Part A and Part B was mixed for 2-3 minutes. Prior to curing the polyurethane coating, the mineral aggregate was spread by broadcasting across the surface of the substrate area. It was then rolled onto the substrate area with roller, squeegee or both.

Upon visual inspection of the coatings of Examples 1-6 above, it was determined that each cured coating compositions exhibit consistent and adequate texture for wet and dry slip resistance for both pedestrian and vehicular applications.

Slip Resistance Testing

The slip resistance properties for certain coating compositions were carried out under dry and wet conditions. A Gibson Pendulum Slip Tester was used to determine the slip resistance of certain coating compositions. The Slip Tester measures the frictional resistance between a rubber slider mounted on the end of a pendulum arm and the test surface. A pendulum consisting of a tubular arm rotates about a spindle attached to a vertical pillar. At the end of the tubular arm, a head of constant mass is fitted with a rubber slider. The pendulum is released from a horizontal position so that it strikes the sample surface with a constant velocity. The distance traveled by the head after striking the sample is determined by the friction of the sample surface. The energy of the upswing is inversely related to the slip resistance and is quantified using a needle.

Slip Resistance Test 1

Examples were prepared using polymer matrices comprising polyurethane polymers that are commercially available from BASF Corporation (Florham Park, N.J., USA) under the designations MASTERSEAL 225, 275 and 295. The aggregate used in the inventive examples of the coating composition was a polyallyldiglycol carbonate commercially available from Composition Materials Co., Inc. For all of the inventive examples (Examples 7, 9, 11), the mix ratio of the polymer matrix to the polycarbonate aggregate was 2:1 by volume. The comparative examples (C8, C10, C12) were MASTERSEAL 225, 275 and 295 polyurethane polymers commercially available from BASF Corporation with silica sand (Unimin 2095) broadcast into the surface of the applied coating. The result of the slip resistance testing are shown in Table 1.

TABLE 1

| Example | Polymer matrix | Polycarbonate Aggregate | | Broadcast Silica Sand | |
|---|---|---|---|---|---|
| | | Dry | Wet | Dry | Wet |
| 7 | 295 | 78 | 67.3 | — | — |
| C8 | 295 | — | — | 75 | 62 |

TABLE 1-continued

| Example | Polymer matrix | Polycarbonate Aggregate | | Broadcast Silica Sand | |
|---|---|---|---|---|---|
| — | — | Dry | Wet | Dry | Wet |
| 9 | 275 | 80 | 64.7 | — | — |
| C10 | 275 | — | — | 79 | 69.5 |
| 11 | 225 | 75 | 71 | — | — |
| C12 | 225 | — | — | 71.2 | 62.4 |

Table 1 shows an overall improvement in both dry and wet slip resistance of coating compositions comprising a polymeric aggregate, as compared to the same coating compositions using broadcast crystalline silica sand aggregate as the anti-slip additive.

Slip Resistance Test 2

Examples were prepared using polymer matrix comprising a one-component polyurethane polymer commercially available from BASF Corporation under the designation MASTERSEAL 225. The aggregate used in the inventive examples (Examples 13, 15) of the coating composition was a polyallyldiglycol carbonate commercially available from Composition Materials Co., Inc. The mix ratio of the polymer matrix to the polycarbonate aggregate for invention example 13 was 6:1 by volume. The mix ratio of the polymer matrix to the polycarbonate aggregate for invention example 15 was 8:1 by volume. The comparative example (C14) was the MASTERSEAL 225 one-component polyurethane polymer commercially available from BASF Corporation with silica sand (Unimin 2095) broadcast into the surface of the applied coating. The result of the slip resistance testing are shown in Table 2.

TABLE 2

| Example | Polymer matrix | Polycarbonate Aggregate | | Broadcast Silica Sand | |
|---|---|---|---|---|---|
| — | — | Dry | Wet | Dry | Wet |
| 13 | 225 | 71.8 | 67.3 | — | — |
| C14 | 225 | — | — | 68.4 | 62.8 |
| 15 | 225 | 71.6 | 65.6 | — | — |

Table 2 shows an overall improvement in both dry and wet slip resistance of coating compositions comprising a polymeric aggregate, as compared to the same coating compositions using broadcast crystalline silica sand aggregate as the anti-slip additive. The mix ratios of polymer matrix to polymer aggregate of 6:1 and 8:1 exhibit similar dry and wet slip resistance.

Slip Resistance Test 3

Examples were prepared using polymer matrix comprising a one-component polyurethane polymer commercially available from BASF Corporation under the designation MASTERSEAL 225 and different thermoset polymeric aggregates. The polymeric aggregate used in example 16 was CLEAR-CUT polycarbonate. The polymeric aggregate used in example 17 was melamine formaldehyde. The polymeric aggregate used in example 18 was urea formaldehyde. All of the polymeric aggregates used in the inventive examples 16-18 are commercially available from Composition Materials Co., Inc. The mix ratio of the polymer matrix to the polymeric aggregate for each of examples 16-18 was 2:1 by volume. The result of the slip resistance testing are shown in Table 3.

TABLE 3

| Example | Polymer matrix | Polycarbonate Aggregate | |
|---|---|---|---|
| — | — | Dry | Wet |
| 16 | 225 | 70.5 | 63.6 |
| 17 | 225 | 75 | 65 |
| 18 | 225 | 77 | 62.6 |

Table 3 shows an overall improvement in both dry and wet slip resistance of coating compositions comprising polycarbonate, melamine or urea aggregate, as compared to coating compositions using crystalline silica sand aggregate as the anti-slip additive.

Processability Analysis

The processability of the inventive coating compositions were evaluated. The Examples used for the processability analysis are the same compositions as Examples 16-18 used in Slip Resistance Testing 3 above. The results of the processability analysis are set forth in Table 4 below.

TABLE 4

| Example | Polymer matrix | Settle Time |
|---|---|---|
| 16 | 225 | 21 minutes |
| 17 | 225 | 5 minutes |
| 18 | 225 | 5 minutes |

Application Testing and Texture Analysis

Figure 5A:
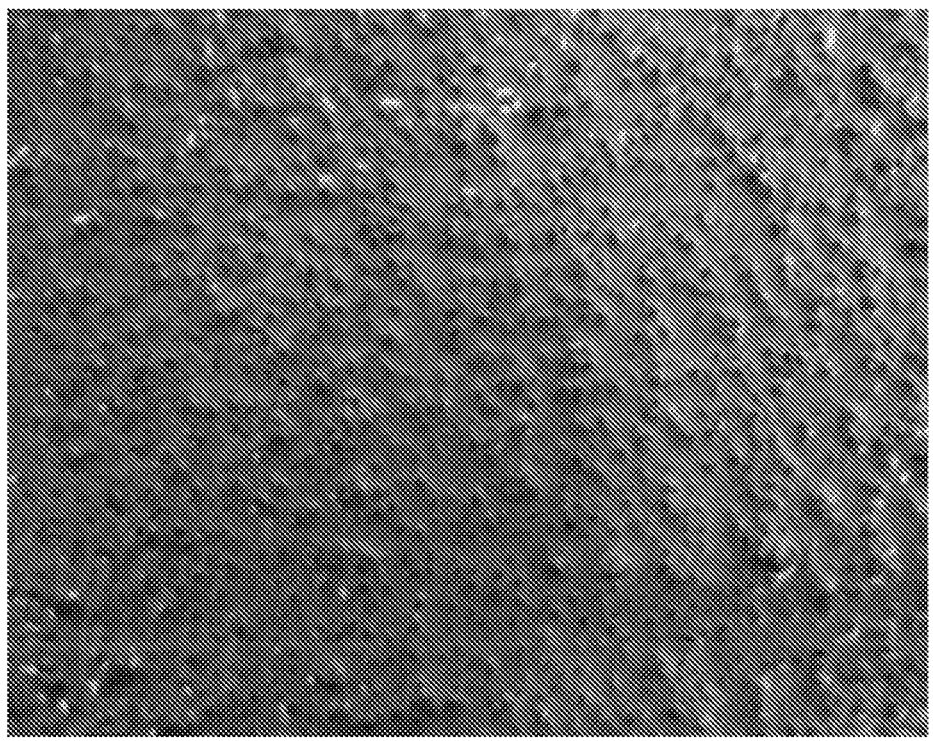
FIGS. 5A and 5B are photographs of illustrative embodiments of the coating composition applied to a substrate and showing a surface texture suitable as a slip resistant coating for traffic.
Figure 5B:
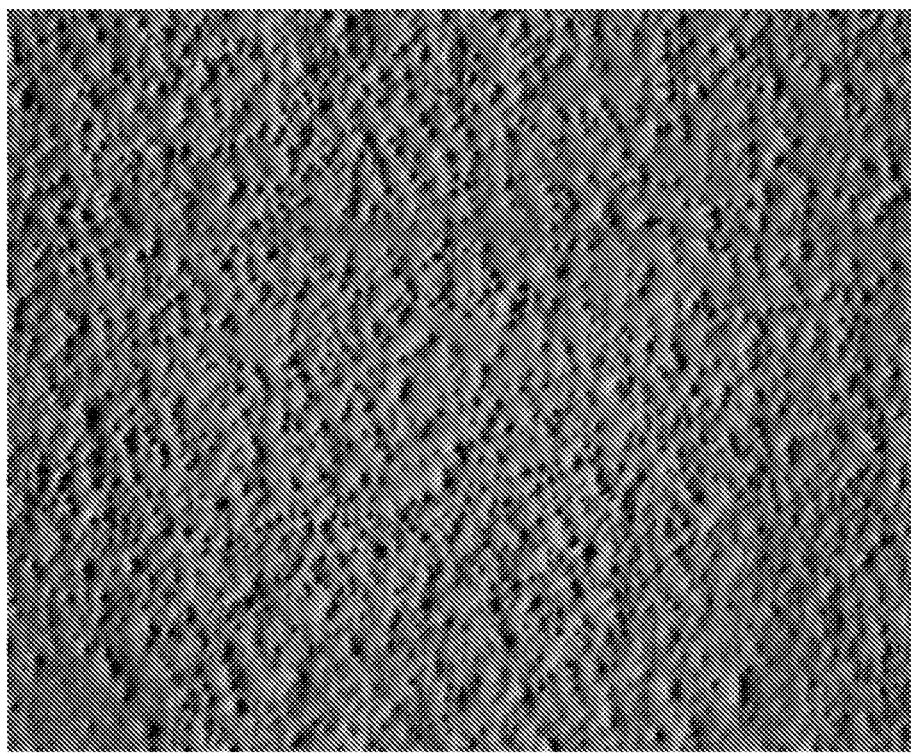

Several tests were conducted to determine amounts of polymeric aggregate needed to produce suitable textures for slip-resistant coating compositions. Three examples of the inventive coating compositions were prepared for this testing. Example 19 was a blend of MASTERSEAL TC 225 one-component polyurethane polymer matrix and CLEAR-CUT polycarbonate aggregate at a mix ratio of 2:1 (polymer matrix to aggregate). Example 20 was a blend of MASTERSEAL TC 275 two-component polyurethane polymer matrix and CLEAR-CUT polycarbonate aggregate at a mix ratio of 2:1 (polymer matrix to aggregate). Example 21 was a blend of MASTERSEAL TC 295 two-component polyurethane polymer matrix and CLEAR-CUT polycarbonate aggregate at a mix ratio of 2:1 (polymer matrix to aggregate). All three examples of the inventive coating composition were easily applied to the surface of a horizontal substrate with a roller. Each of the examples exhibited excellent appearance and texture that was suitable as a slip resistant coating for pedestrian traffic. FIG. 5A is a photograph of the coating composition of Example 19 applied to a substrate. FIG. 5B is a photograph of the coating composition of Example 20 applied to a substrate. Both FIGS. 5A and 5B demonstrate that the cured coating have an aesthetically pleasing appearance and suitable textured surface to provide a slip resistant coating for traffic.

Figure 6A:
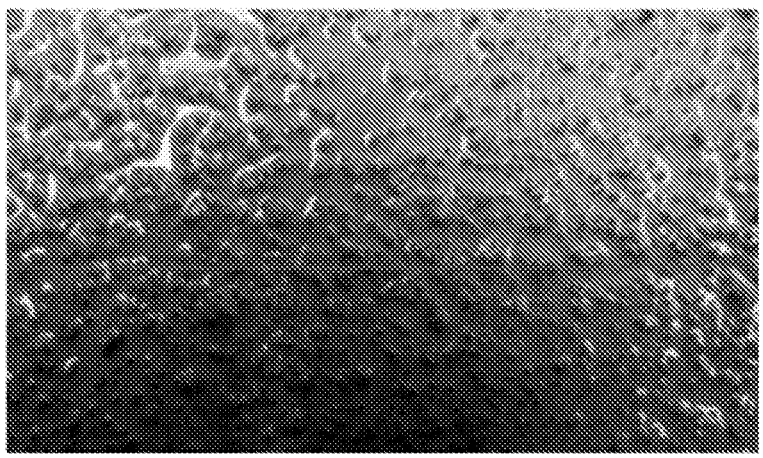
FIGS. 6A-6C are photographs of illustrative embodiments of the coating composition applied to a substrate and showing a surface texture suitable as a slip resistant coating for traffic.
Figure 6B:
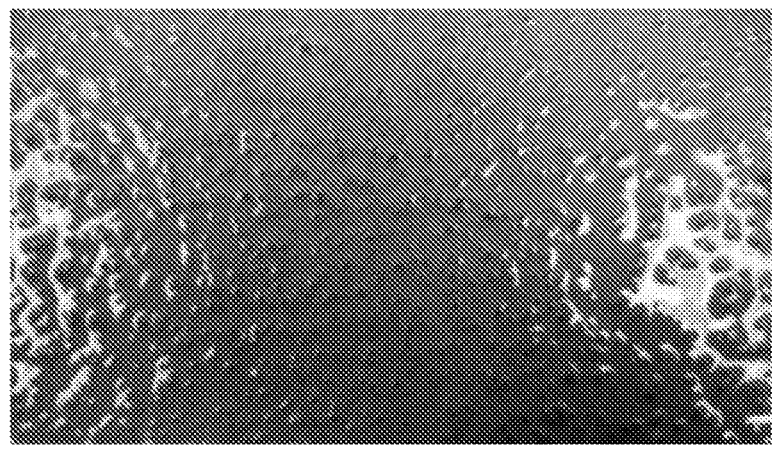
Figure 6C:
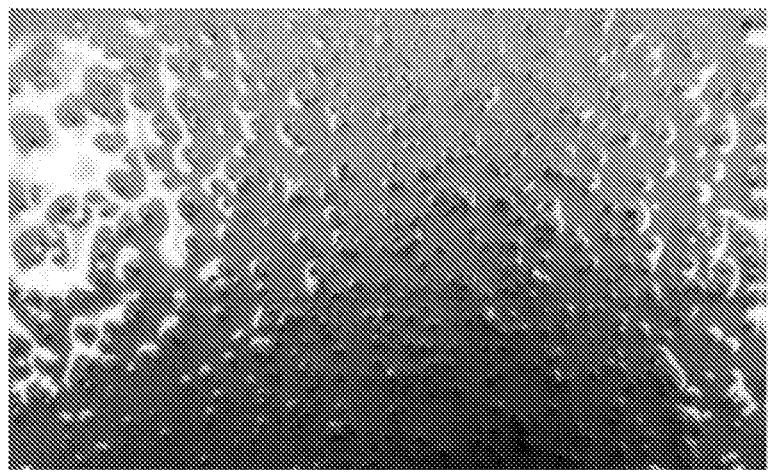

Example 22 was a blend of MASTERSEAL TC 225 one-component polyurethane polymer matrix and CLEAR-CUT polycarbonate aggregate at a mix ratio of 4:1 (polymer matrix to aggregate). Example 23 was a blend of MASTERSEAL TC 225 one-component polyurethane polymer matrix and CLEAR-CUT polycarbonate aggregate at a mix ratio of 6:1 (polymer matrix to aggregate). Example 24 was a blend of MASTERSEAL TC 225 one-component polyurethane polymer matrix and CLEAR-CUT polycarbonate aggregate at a mix ratio of 8:1 (polymer matrix to aggregate). The examples of the inventive coating composition were easily applied to the surface of a horizontal substrate with a roller. Each of the examples exhibited excellent appearance and texture that was suitable as a slip resistant coating for pedestrian traffic. FIG. 6A is a photograph of the coating composition of Example 22 applied to a substrate. FIG. 6B is a photograph of the coating composition of Example 23 applied to a substrate. FIG. 6B is a photograph of the coating composition of Example 24 applied to a substrate. FIGS. 6A-6C demonstrate that the cured coating have an aesthetically pleasing appearance and suitable textured surface to provide a slip resistant coating for traffic.

While the coating composition, coated substrate, and methods of making the coating composition and coating a substrate with the coating composition have been described in connection with various illustrative embodiments, it is to be understood that other similar embodiments may be used or modifications and additions may be made to the described embodiments for performing the same function disclosed herein without deviating therefrom. The illustrative embodiments described above are not necessarily in the alternative, as various embodiments may be combined to provide the desired characteristics. Therefore, the coating, coated substrate and methods should not be limited to any single embodiment, but rather construed in breadth and scope in accordance with the recitation of the appended claims.

The invention claimed is:

1. A coating comprising:
   a polymer matrix; and
   an organic polymer aggregate,
   wherein:
      the density of said polymer aggregate is within +40 percent of the density of said polymer matrix, and
      a volume ratio of said polymer matrix to said organic polymer aggregate in said coating is in a range of about 5:1 to about 10:1.

2. The coating of claim 1, wherein said polymer matrix is selected from the group consisting of epoxy, polyaspartic, polymethacrylate, and polyurethane.

3. The coating of claim 2, wherein said polymer matrix comprises said polyurethane.

4. The coating of claim 3, wherein said organic polymer aggregate comprises polycarbonate, melamine, urea and mixtures thereof.

5. The coating of claim 4, wherein said organic polymer aggregate comprises polycarbonate.

6. The coating of claim 1, wherein the volume ratio of said polymer matrix to said organic polymer aggregate in said coating is in the range of about 5:1 to about 8:1.

7. A coated substrate comprising:
   a substrate having opposite facing first and second major surfaces; and
   at least one layer of said coating of claim 1 on one of said first or second major surfaces of said substrate.

8. The coated substrate of claim 7, wherein said substrate comprises a floor substrate.

9. The coated substrate of claim 7, wherein said substrate comprises a deck substrate.

10. A method for coating a substrate, the method comprising:
    applying at least one layer of the coating of claim 1 to a surface of a substrate.

11. A method for coating a substrate comprising:
    applying at least one layer of a polymer matrix to a surface of a substrate; and
    applying a plurality of organic polymer aggregates onto said polymer matrix, wherein:
       the density of said organic polymer aggregate is within +40 percent of the density of said polymer matrix, and
       a volume ratio of said polymer matrix to said organic polymer aggregate in said coating is in a range of about 5:1 to about 10:1.

12. The coating of claim 1, wherein the volume ratio of said polymer matrix to said organic polymer aggregate in said coating is in the range of about 5:1 to about 7:1.

13. The coating of claim 1, wherein the volume ratio of said polymer matrix to said organic polymer aggregate in said coating is in the range of about 5:1 to about 6:1.

14. The coating of claim 1, wherein the density of said polymer aggregate is 10 percent or more and 40 percent or less of the density of said polymer matrix.

15. The coating of claim 1, wherein:
    said polymer matrix comprises polyurethane, and
    said organic polymer aggregate comprises polycarbonate.

16. A composition comprising:
    a polymer matrix comprising polyurethane; and
    an organic polymer aggregate comprising polycarbonate,
    wherein:
       the density of said polymer aggregate is 10 percent or more and 40 percent or less of the density of said polymer matrix, and
       a volume ratio of said polymer matrix to said organic polymer aggregate in said composition is in a range of about 5:1 to about 10:1.

17. The composition of claim 16, wherein the volume ratio of said polymer matrix to said organic polymer aggregate in said composition is in the range of about 5:1 to about 8:1.

18. The composition of claim 16, wherein the volume ratio of said polymer matrix to said organic polymer aggregate in said composition is in the range of about 5:1 to about 7:1.

19. The composition of claim 16, wherein the volume ratio of said polymer matrix to said organic polymer aggregate in said composition is in the range of about 5:1 to about 6:1.

* * * * *